United States Patent [19]
Yamauchi et al.

[11] Patent Number: 5,148,329
[45] Date of Patent: Sep. 15, 1992

[54] MAGNETIC RECORDING/REPRODUCING CIRCUIT SYSTEM INCLUDING A TEMPERATURE CONTROLLED AMPLITUDE CONTROL CIRCUIT FOR A VIDEO SIGNAL

[75] Inventors: Hiroto Yamauchi; Tomishige Yatsugi, both of Katsuta, Japan

[73] Assignee: Hitachi, Ltd., Tokyo, Japan

[21] Appl. No.: 666,033

[22] Filed: Mar. 7, 1991

[30] Foreign Application Priority Data

Mar. 7, 1990 [JP] Japan .................................. 2-53801

[51] Int. Cl.$^5$ ............................................. G11B 5/02
[52] U.S. Cl. .................................. 360/19.1; 360/68; 358/327
[58] Field of Search .................. 360/19.1, 65, 68; 369/94; 358/327

[56] References Cited

U.S. PATENT DOCUMENTS

4,713,700  12/1987  Kuwahara et al. ............... 360/68 X

Primary Examiner—Andrew L. Sniezek
Attorney, Agent, or Firm—Antonelli, Terry, Stout & Kraus

[57] ABSTRACT

A magnetic recording/reproducing circuit system which comprises an amplitude control circuit and wherein a video recording signal and voice recording signal are supplied to a magnetic head to be written as superimposed on surface and deep layers of a magnetic recording medium in a record mode and to be reproduced from the recording medium in a reproduction mode. In the record mode, the amplitude control circuit detects an ambient temperature and controls a current value indicative of the video recording signal to be optimum for the detected temperature. As a result, in the reproduction mode, a reproduction video signal can be substantially stabilized regardless of a variation in the ambient temperature.

10 Claims, 7 Drawing Sheets

MAGNETIC RECORDING/REPRODUCING CIRCUIT SYSTEM INCLUDING A TEMPERATURE CONTROLLED AMPLITUDE CONTROL CIRCUIT FOR A VIDEO SIGNAL

BACKGROUND OF THE INVENTION

The present invention relates to a magnetic recording/reproducing circuit system wherein a video recording signal and a voice recording signal are supplied to a magnetic head to be recorded as superimposed on a magnetic recording medium and also to be reproduced from the recording medium.

A most ordinary apparatus for recording and reproducing a video signal and a voice signal is a video tape recorder (which will be abbreviated to the VTR, hereinafter).

In the VTR, a brightness signal in the video signal is FM-modulated at an FM modulator, a color signal therein is frequency-converted in its low band, and the brightness and color signals are then mixed together to form a recording signal. The recording signal is alternately supplied to two video heads through a recording amplifier and a rotary transformer to be recorded on video tape being fed as contacted with the video heads.

The recording amplifier is previously adjusted so that a recording current becomes its optimum value (at which the maximum reproduction output is obtained).

Meanwhile, a voice FM signal is subjected to a processing that is substantially the same as the brightness signal of the above video signal. In a high tone-quality VHS type VTR, in particular, the voice signal is recorded in a deep layer of the magnetic tape earlier than the video signal. In other words, the video signal is recorded as superimposed on a voice-signal recording part of the deep layer while erasing the already recorded voice-signal part of the surface layer of the magnetic tape.

The video and voice signals recorded in the video tape are alternately again reproduced by two video heads. Since the reproduced low-frequency carrier FM signal produces an output voltage as low as several 100 $\mu V$, these signal are amplified at respective reproducing amplifiers. With regard to the brighgtness signal in the amplified video reproduction signal, the reproduction signal is passed through a high-pass filter to remove low-frequency converted color signal components from the brightness signal, through a drop-out compensation circuit to erase a signal defect accidentally occurred at the time of its recording and reproducing, and through a limiter to remove level variation components therefrom, and then sent to an FM demodulator for its demodulation.

When the recording signal is recorded on the video tape through the magnetic head, an anti-magnetizing force $H_c$ of magnetic material of the video tape varies with temperature, even when the recording amplifier is previously set so that the recording current has its optimum value as mentioned above. For this reason, a variation in the surrounding temperature also causes a variation of the optimum value of the recording current, which results in that, even when recording is carried out with the recording current having a constant amplitude, the reproduction-voice output signal voltage inevitably varies with temperature.

Figure 1:
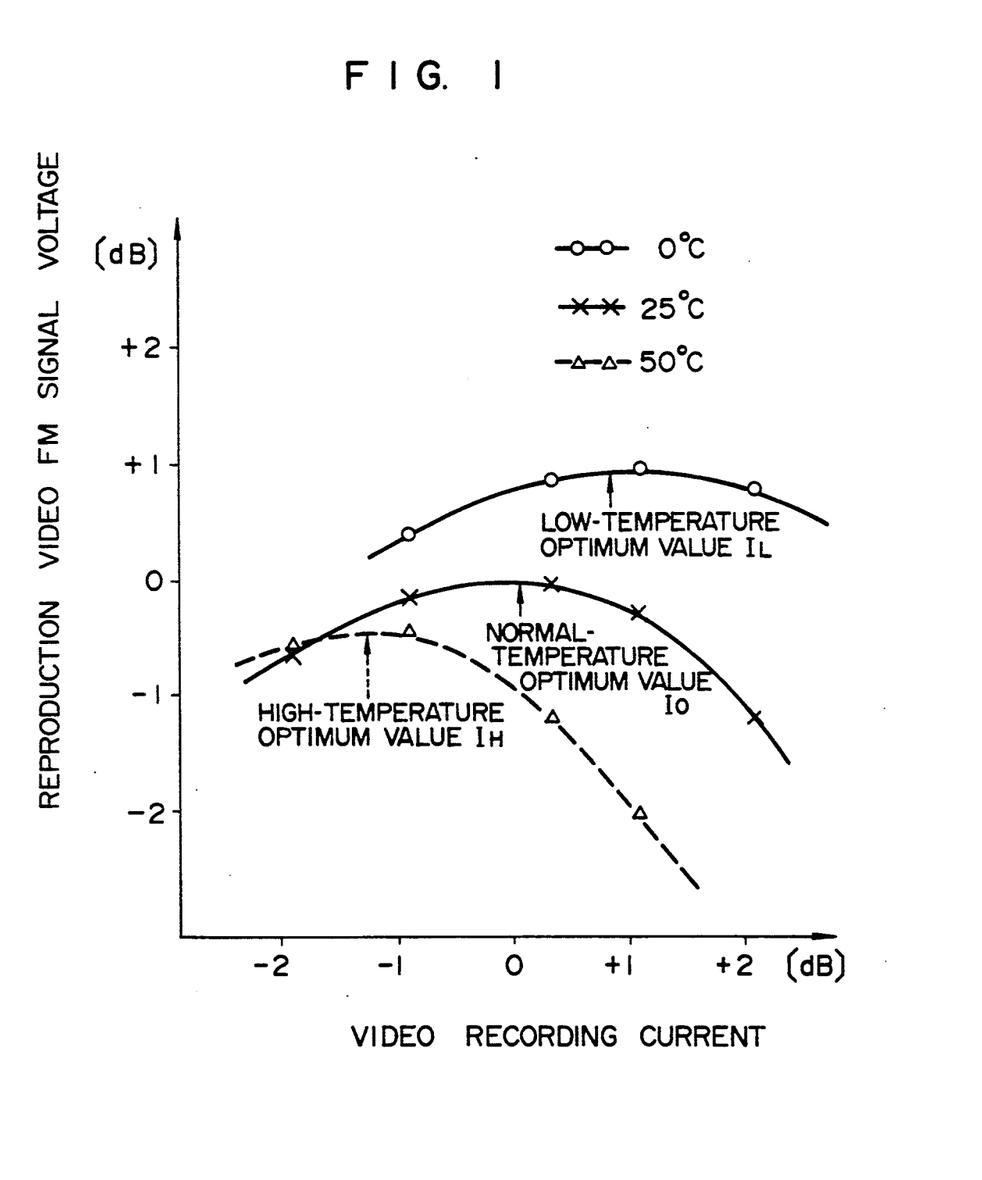
FIG. 1 is a characteristic diagram showing a relationship of a reproduction video FM signal voltage to a video recording current.

FIG. 1 is a graph showing (in relative-value scales) a reproduction video FM signal voltage characteristic (molar characteristic) to the video recording current value with respect to different temperature parameters. In the drawing, measurement points at ambient temperatures of 0°, 25° and 50° C. are denoted by ◯, x and Δ respectively.

It will be appreciated from the graph that, for any of these temperatures, as the recording current is gradually increased from zero, the reproduction video FM signal voltage increases and reaches at its maximum level and then gradually decreases. That is, a current value $I_o$ of the reproduction signal providing the maximum output voltage corresponds to the optimum value of the video recording current for the associated temperature. As will be seen from FIG. 1, the optimum value ($I_L$) of the video recording current at a low temperature is larger than that at a normal temperature and the optimum value ($I_H$) of the video recording current at a high temperature is smaller than that at the normal temperature.

This is because the anti-magnetizing force $H_c$ of the magnetic tape drops with the increased temperature. It will be noted from the above consideration that a rise in the surrounding temperature causes the optimum value of the video recording current to be shifted to its smaller value, while a drop in the surrounding temperature causes the optimum value of the video recording current to be shifted to its larger value.

As mentioned above, in the high tone quality VHS type VTR, the FM voice signal is recorded in the deep layer of the video tape whereas the video signal is recorded in the surface layer thereof. Since the video signal is recorded while erasing the surface layer having the voice FM signal already recorded thereon, the reproduction output voltage of the voice FM signal is dependent on the recording level of the video signal. In other words, when the recording level of the video signal becomes high, the reproduction output voltage of the voice FM signal becomes small, whereas, when the recording level of the video signal becomes small, the reproduction output voltage of the voice FM signal becomes large.

Figure 2:
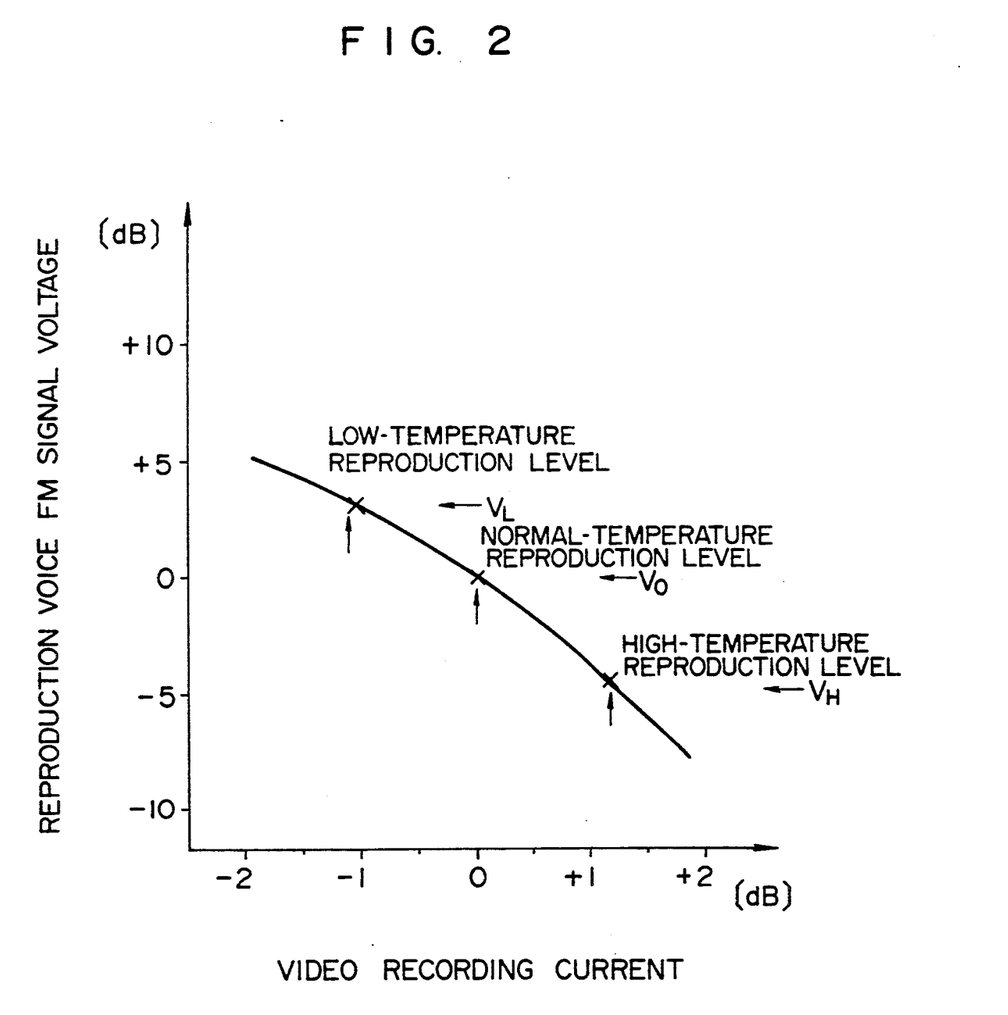
FIG. 2 is a characteristic diagram showing a relationship of a reproduction voice FM signal voltage to the video recording current.

FIG. 2 is a graph showing (in relative-value scales) a reproduction voice FM signal output voltage characteristic to the video recording current. It will be seen from FIG. 2 that, as the video recording current increases, the reproduction voice FM signal output voltage decreases.

As will be understood from FIGS. 1 and 2, even when the video recording current is set to have its optimum value $I_o$ while the reproduction video signal output is set to have its reference value (0 dB) at the normal temperature, the recording current value becomes low at the low temperature while becomes too high at the high temperature. Accordingly, even when the reproduction voice FM signal output level is set to have its optimum $V_o$ (0 dB), the reproduction voice FM signal output level becomes as too high as $V_L$ at the low temperature while becomes as too low as $V_E$, as shown in FIG. 2.

Generally speaking, when the level of an output signal reproduced by a magnetic head is reduced, a ratio of the signal output to preamplifier noise or tape noise (S/N ratio) becomes small so that the tone quality is deteriorated, thus disabling high tone-quality reproduction.

SUMMARY OF THE INVENTION

In view of the above problems, it is an object of the present invention to provide a magnetic recording/reproducing circuit system for recording and reproducing a video signal and a voice signal, wherein a video recording current can be maintained at its optimum value regardless of variations in the ambient temperature and thus can stabilize an FM voice reproduction output level.

The above object is attained by providing a magnetic recording/reproducing circuit system wherein a video recording signal and voice recording signal are supplied to a magnetic head to be written as superimposed on surface and deep layers of a magnetic recording medium, and which system comprises an amplitude control circuit for detecting an ambient temperature and controlling a current value indicative of the video recording signal to have its optimum value for the detected temperature.

More in detail, the amplitude control circuit detects the ambient temperature through a temperature-sensitive resistive element and controls the amplitude of the video recording current to be decreased according to a rise in the ambient temperature.

Further, the amplitude control circuit detects an output current value of the video recording signal and controls the current value of the video recording signal on the basis of the detected current value.

The magnetic recording/reproducing circuit system includes a magnetic recording/reproducing circuit.

The amplitude control circuit detects the ambient temperature and controls the amplitude of the video recording current in response to a variation in the ambient temperature. For example, when the ambient temperature rises and correspondingly the resistive value of the temperature-sensitive element varies, the amplitude control circuit decreases the amplitude of the video recording current.

Or the amplitude control circuit controls the recording current to be optimum for the temperature on the basis of the output detection value of the video recording current.

In accordance with the present invention, since the video recording current can be set always at its optimum value regardless of the ambient temperature, it can be prevented that an excessive video recording level at a high temperature causes reduction of the reproduction voice FM signal voltage, whereby the tone quality of the voice signal can be maintained high.

Further, since the video recording current can be set to be always optimum regardless of the ambient temperature, even when the ambient temperature drops, the reproduction output level of the video signal itself can be prevented from being reduced and thus the reproduction video signal with the best S/N ratio can be obtained at all times.

Furthermore, since the recording level of the video signal is maintained constant regardless of the ambient temperature, a ratio of the FM recording level of the optimum brightness signal to the recording level of a low-frequency conversion color signal can be also maintained constant, whereby a color reproduction video signal always with less noise can be obtained In addition, the temperature-sensitive resistive element as well as the amplitude control circuit having a temperature characteristic for detecting the video output signal to control the video recording current can make up a simple and inexpensive magnetic recording/reproducing circuit system.

DESCRIPTION OF THE PREFERRED EMBODIMENTS

Embodiments of the present invention will be detailed with reference to FIGS. 3 to 8.

Figure 3:
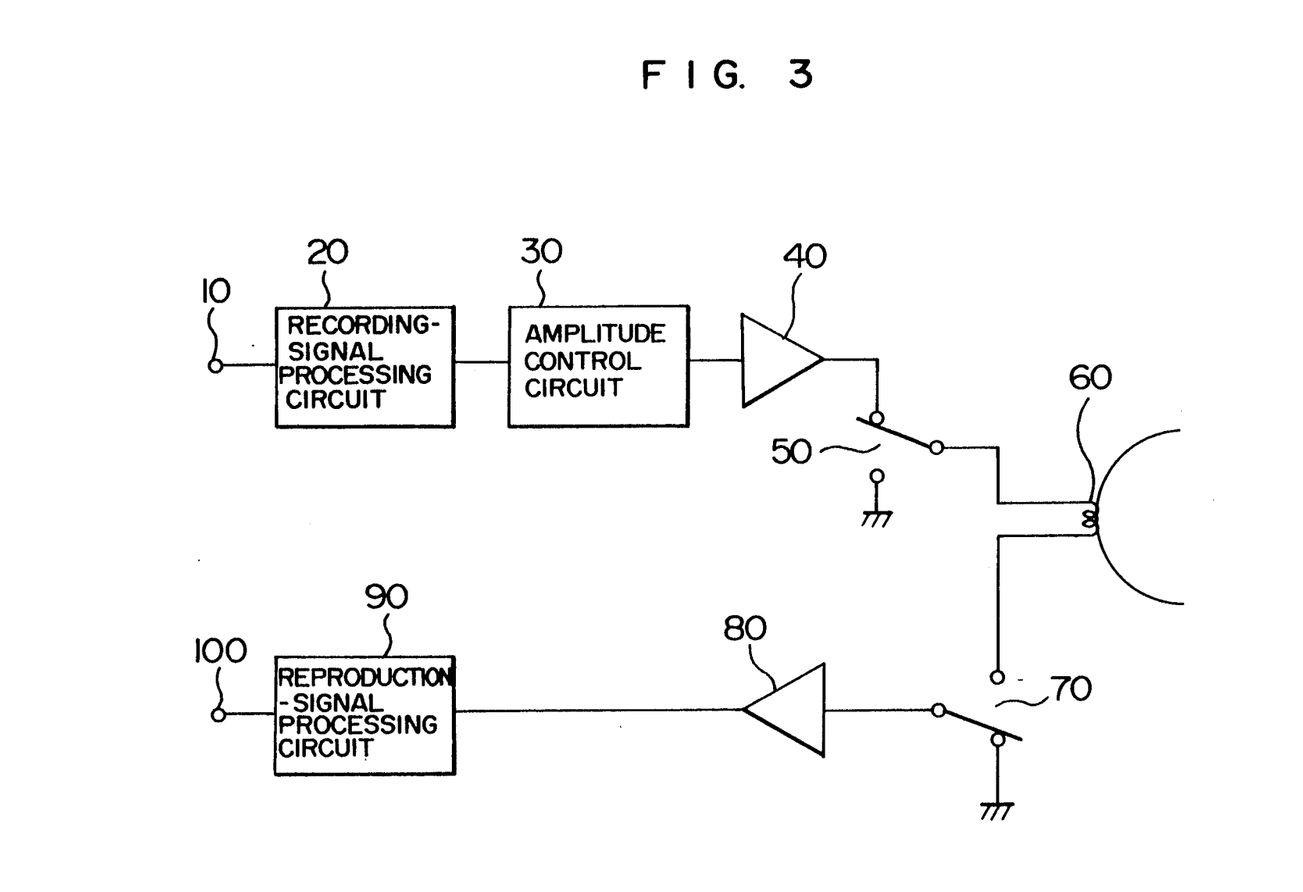
FIG. 3 shows a magnetic recording/reproducing circuit system in accordance with a first embodiment of the present invention.

Referring first to FIG. 3, there is shown a block diagram of a magnetic recording/reproducing circuit system in accordance with an embodiment of the present invention, which records and reproduces a video signal in a VTR. The system of FIG. 3 includes an input terminal 20 to which an input signal (video signal) is applied, a recording-signal processing circuit 20 for converting the input signal applied to the input terminal 10 into a recordable signal, an amplitude control circuit 30 having a temperature characteristic for receiving a converted signal from the recording-signal processing circuit 30, a recording amplifier 40 for amplifying the recording signal controlled by the amplitude control circuit 30, a switch 50 connected to an output of the recording amplifier 40 for switching between recording and reproducing operations, a magnetic recording/reproducing head 60 for recording the recording signal received from the switch 60 on a recording medium (magnetic tape) and for reproducing a reproduction signal received from the recording medium, a switch 70 for switching between the recording and reproducing operations in synchronism with the switch 50, a reproducing amplifier 80 for amplifying the reproduction signal reproduced at the magnetic recording/reproducing head 60 and received through the switch 70, a reproduction signal processing circuit 90 for converting the reproduction signal amplified by the reproducing amplifier 80 into a video signal, and an output terminal 100 to which an output signal of the reproduction signal processing circuit 90 is applied.

More in detail, the recording-signal processing circuit 20 FM-modulates a video brightness signal received from the input terminal 10 and outputs a recording FM signal to the amplitude control circuit 30. The circuit 30 receives the recording FM signal from the recording-signal processing circuit 20 and varies the amplitude of the video recording signal according to the ambient temperature to control a recording current to be passed through the magnetic head 60.

As will be seen from FIG. 2, in the case where the ambient temperature rises for example, the video recording current is made small by an amount corresponding to a variation in the optimum recording current so as to approach the optimum value in response to the rise in the ambient temperature, whereby a reproduction voice FM output voltage is prevented from being changed.

Figure 6:
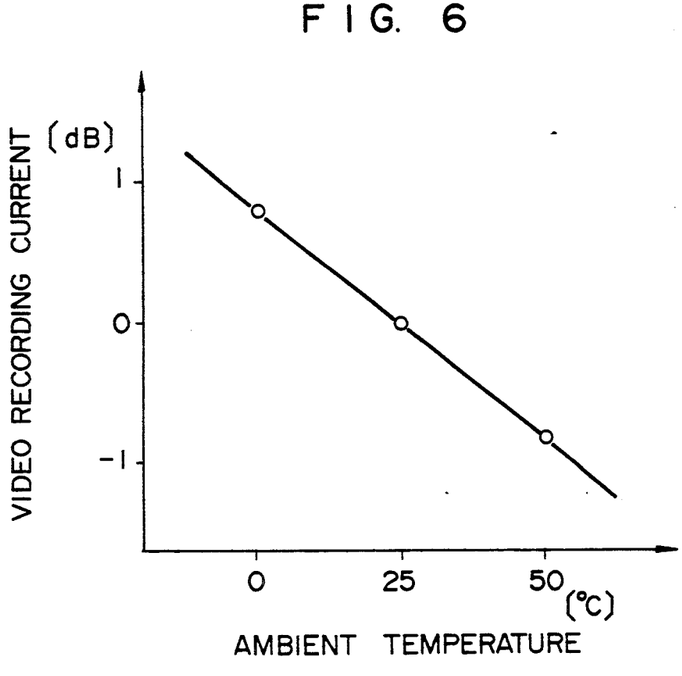
FIG. 6 shows a relationship between ambient temperature and a video recording current.

For example, when a characteristic curve showing a relationship between the video recording current and the ambient temperature is as shown in FIG. 6, the video recording current can be approached to its optimum value by changing the recording current depending on an increase or a decrease in the ambient temperature.

Figure 7:
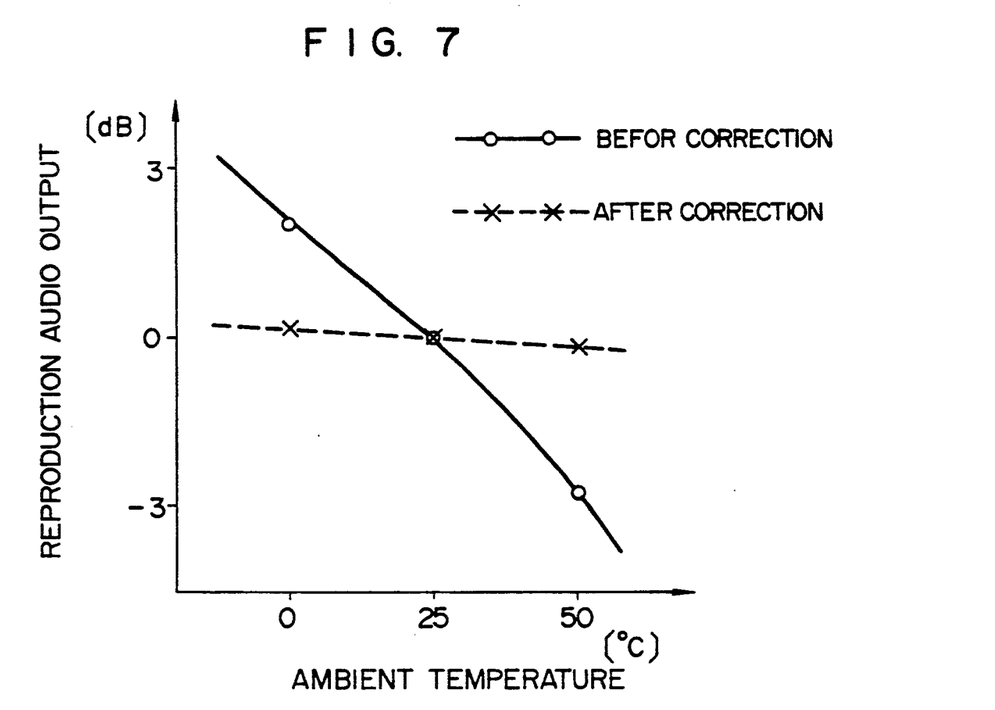
FIG. 7 shows a relationship between the ambient temperature and a reproduction voice output.

As a result, the curve of FIG. 6 is corrected to such a curve (shown by a dotted line) as shown in FIG. 7, in which case a reproduction audio output can be stabilized even when the ambient temperature varies. That is, the stabilization of the reproduction audio output can be improved as shown in FIG. 7 by changing the characteristic of FIG. 6.

The amplitude control circuit 30 determines a recording current according to the ambient temperature and sends a recording signal indicative of the determined recording current to the recording amplifier 40. The recording signal is amplified at the recording amplifier 40 and then sent through the switch 50 to the magnetic head 60 to be recorded on the recording medium thereat.

In a reproduction mode, a reproduction signal reproduced at the magnetic head 60 is supplied through the switch 70 to the reproduction amplifier 80 for its amplification. The amplifier reproduction signal is FM-demodulated at the reproduction signal processing circuit 90 where a video signal is extracted from the reproduction signal. The circuit 90 outputs the extracted video signal to the output terminal 100.

Figure 4:
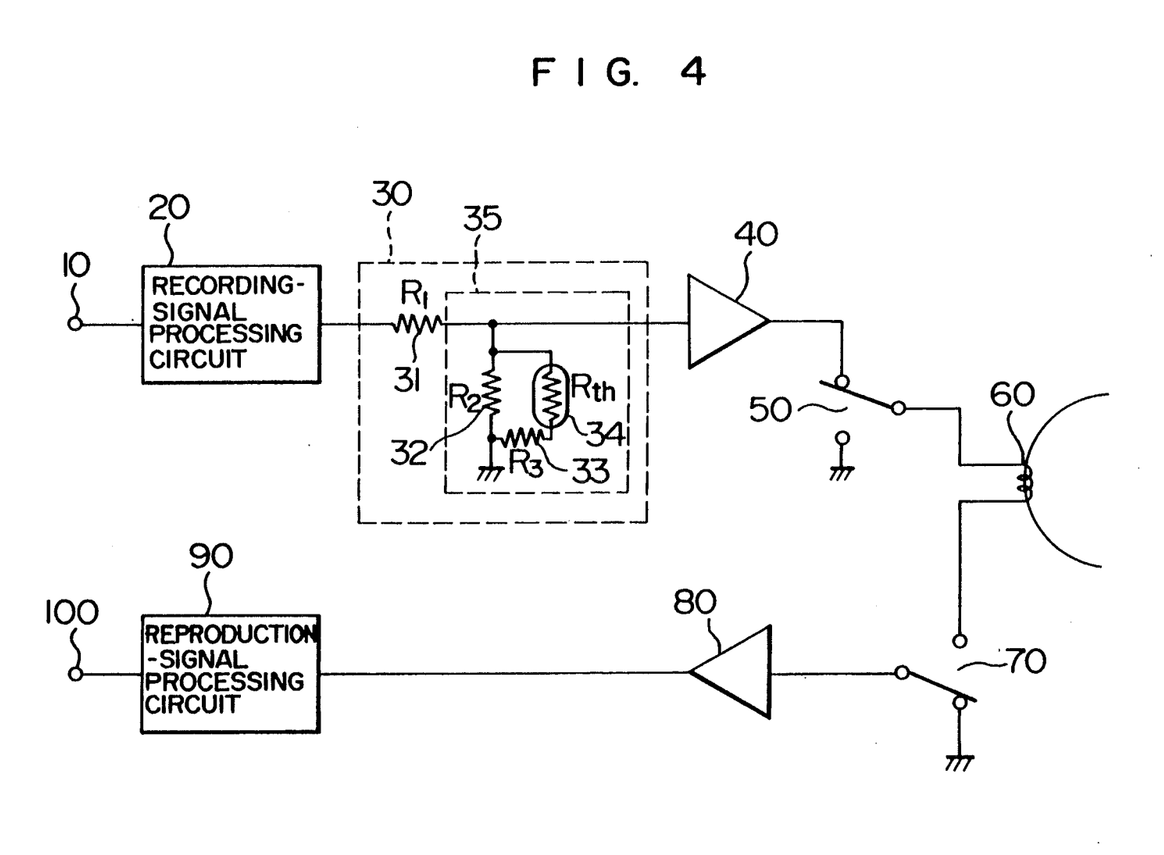
FIG. 4 shows details of an example of an amplitude control circuit included in the magnetic recording/reproducing circuit system of FIG. 3.

FIG. 4 shows details of an example of the amplitude control circuit 30 in the magnetic recording/reproducing circuit system of the embodiment of FIG. 3. More specifically, the amplitude control circuit 30 includes a fixed resistor 31 (having a resistance of R1) connected in series with the recording signal processing circuit 20 as well as a combined-resistors circuit 35 having a total resistance of $R_c$ and connected in parallel to the recording amplifier 40. More in detail, the combined-resistors circuit 35 has a fixed resistor 32 (having a resistance of $R_2$) as well as a parallel circuit of a fixed resistor 33 (having a resistance of $R_3$) and a thermistor 34 (having a resistance of $T_{th}$) connected in series with each other. The video recording current is determined by a ratio r ($=R_1:R_c$) of the resistance $R_1$ of the resistor 31 to the combined resistance $R_c$ of the combined-resistors circuit 35. For example, when the ambient temperature rises, the resistance $R_{th}$ of the thermistor 34 drops, so that, as the resistance $R_{th}$ is decreased, the total resistance $R_c$ of the combined-resistors circuit 35 is also decreased. The decrease of the total resistance $R_c$ causes the decrease of amplitude of the recording signal to be sent to the recording amplifier 40 so that the magnetic recording current is decreased.

When the ambient temperature drops, a phenomenon opposite to the above takes place.

Figure 5:
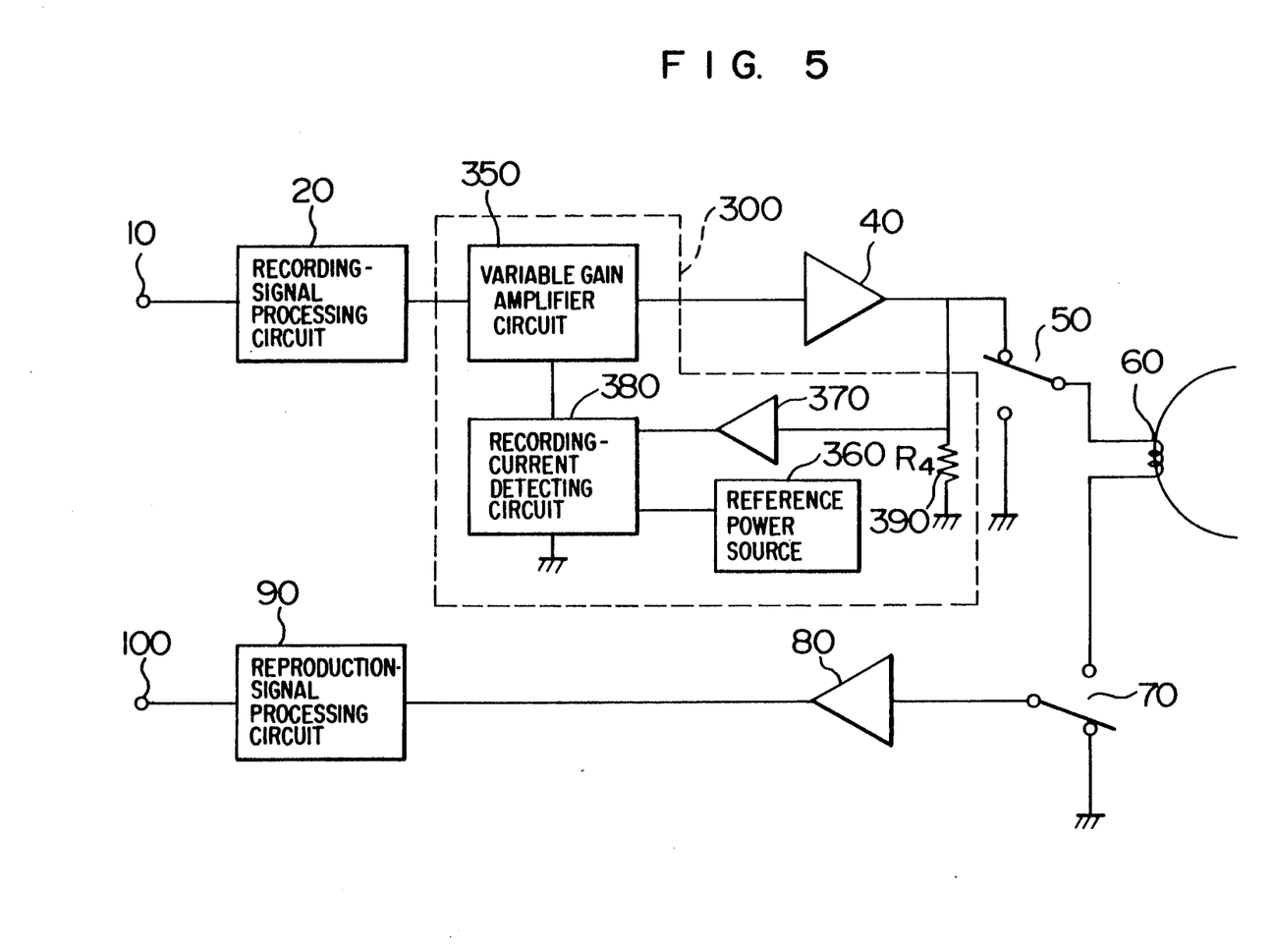
FIG. 5 shows details of another example of the amplitude control circuit included in the magnetic recording/reproducing circuit system of FIG. 3.

Shown in FIG. 5 is details of another example of the amplitude control circuit in the magnetic recording/reproducing circuit system of the embodiment of FIG. 3. An amplitude control circuit 300 in FIG. 5 includes a variable gain amplifier circuit 350 for varying a gain according to a gain control signal, a reference power source 360 for setting an optimum recording current, a detected recording-current amplifier 370, a recording-current detecting circuit 380 for generating the gain control signal, and a resistor 390 as a load. Other arrangement of FIG. 5 is substantially the same as that of FIG. 3.

More concretely, the reference power source 360 generates a reference voltage $E_o$ based on the ambient temperature. The generation of the reference voltage $E_o$ based on the ambient temperature by the reference power source 360 is realized, for example, by utilizing the forward voltage drop characteristic of a transistor. A video recording signal detected by the load resistor 390 is amplified by the detected recording-current amplifier 370 and then converted to a DC signal by the recording-current detecting circuit 380. The recording-current detecting circuit 380 further compares the converted DC signal, i.e., a voltage $E_r$ with the reference voltage Eo and outputs a gain control signal corresponding to a difference therebetween ($E_r - E_o$) to the variable gain amplifier circuit 350. The circuit 350 acts to change the amplitude of the recording signal according to the gain control signal received from the recording-current detecting circuit 380.

Although the gain control signal based on the temperature variation has been obtained by changing the reference voltage $E_o$ generated at the reference power source 360 in the foregoing embodiment, this may be also realized by providing a desired temperature characteristic to a circuit of the load resistor 390, the recording-current detecting amplifier 370 and recording-current detecting circuit 380 with the reference voltage $E_o$ being made constant.

Figure 8:
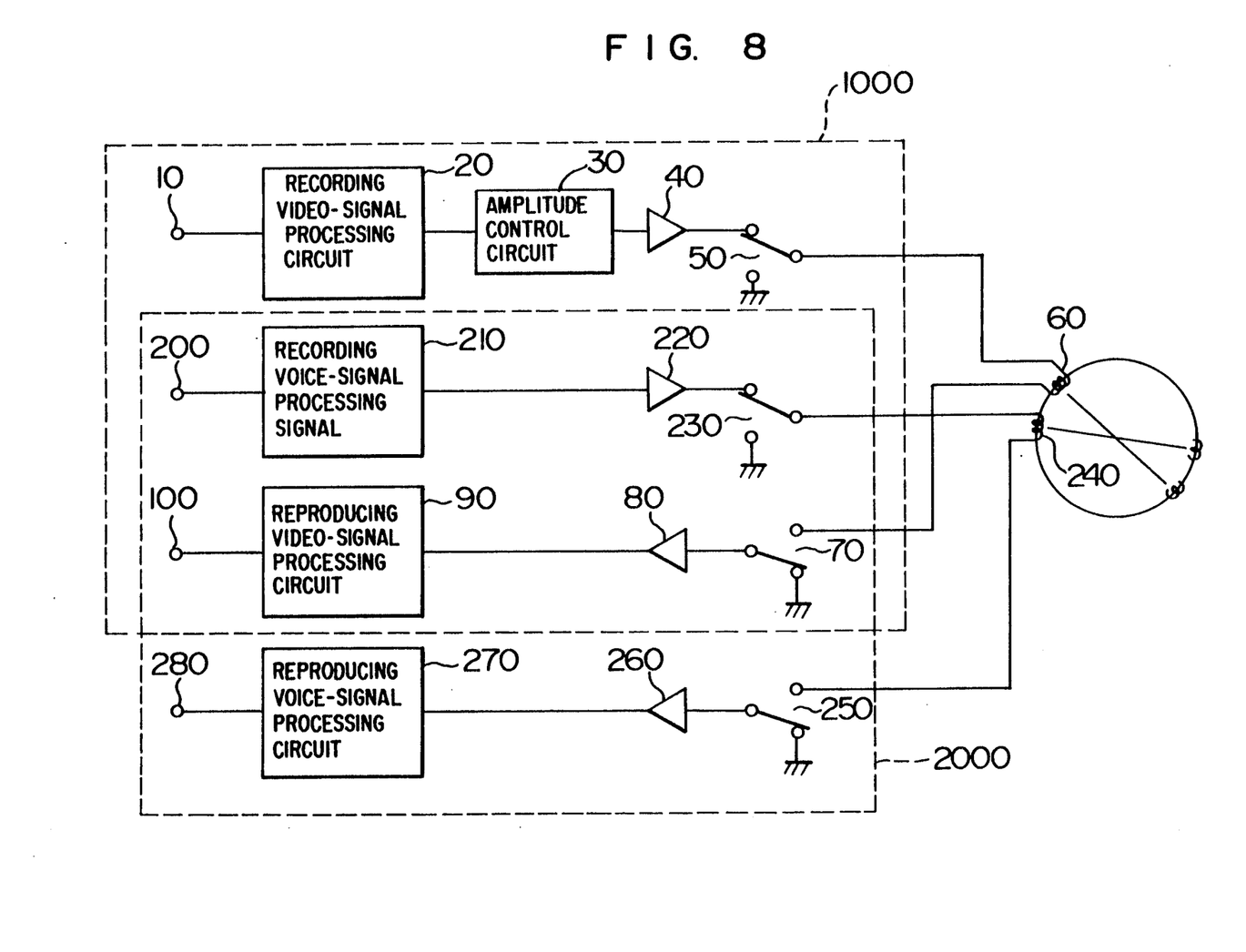
FIG. 8 shows a magnetic recording/reproducing circuit system in accordance with a second embodiment of the present invention.

There is shown in FIG. 8 a magnetic recording/reproducing circuit system in accordance with a second embodiment of the present invention. The system of FIG. 8 comprises a magnetic recording/reproducing circuit 1000 for video signal and a magnetic recording/reproducing circuit 2000 for voice signal. The video-signal magnetic recording/reproducing circuit 1000 is substantially the same in configuration as the magnetic recording/reproducing circuit of FIG. 3. The voice-signal magnetic recording/reproducing circuit 2000 includes a recording voice-signal processing circuit 210 for converting a voice signal received from an input terminal 200 into a recordable signal, a recording amplifier 220 for amplifying the recordable output signal of the recording voice-signal processing circuit 210, a change-over switch 230 connected to the recording amplifier 220 for switching between record and reproduction modes, a magnetic head 240 for recording the recordable signal received from the change-over switch 230 on a recording medium, a change-over switch 250 connected to the magnetic head 240 for switching between the record and reproduction modes in synchronism with the change-over switch 230, a reproducing amplifier 260 for amplifying a reproduction signal reproduced from the recording medium and received through the change-over switch 250, a reproducing voice-signal processing circuit 270 for converting the reproduction signal amplified at the reproducing amplifier 260 into a voice signal, and an output terminal 280 to which the reproducing voice-signal processing circuit 270 outputs the voice signal.

What is claimed is:

1. A magnetic recording/reproducing circuit system wherein a video recording signal and voice recording signal are supplied to a magnetic head to be written as superimposed on surface and deep layers of a magnetic recording medium in a record mode and to be reproduced from the recording medium in a reproduction mode, said system comprising an amplitude control circuit for detecting an ambient temperature and controlling a current value indicative of the video recording signal to have an optimum value for the detected temperature.

2. A magnetic recording/reproducing circuit system as set forth in claim 1, wherein said amplitude control circuit controllably decreases the current value indicative of said video recording signal according to a rise in the ambient temperature.

3. A magnetic recording/reproducing circuit system as set forth in claim 1, wherein detection of the ambient temperature by said amplitude control circuit is carried out by a temperature-sensitive resistive element whose resistance varies with a temperature variation.

4. A magnetic recording/reproducing circuit system as set forth in claim 1, wherein said amplitude control circuit detects the current value indicative of said video recording signal and controls the current value of the video recording signal on the basis of the detected current value.

5. A magnetic recording/reproducing circuit system as set forth in claim 2, wherein detection of the ambient temperature by said amplitude control circuit is carried out by a temperature-sensitive resistive element whose resistance varies with a temperature variation.

6. A magnetic recording/reproducing circuit system as set forth in claim 2, wherein said amplitude control circuit detects the current value indicative of said video recording signal and controls the current value of the video recording signal on the basis of the detected current value.

7. A magnetic recording/reproducing circuit system comprising:
a recording video-signal processing circuit for receiving a video signal and converting the video signal into a video recording signal;
an amplitude control circuit for receiving said video recording signal from the recording video-signal processing circuit and controlling a current value indicative of the video recording signal to be optimum for an ambient temperature;
a magnetic head for recording on a recording medium the video recording signal having an optimum temperature characteristic provided by the amplitude control circuit; and
a reproducing video-signal processing circuit for converting into a video signal a reproduction signal reproduced from the recording medium through the magnetic head.

8. A magnetic recording/reproducing circuit system comprising:
a recording video-signal processing circuit for receiving a video signal and converting the video signal into a video recording signal;
an amplitude control circuit for receiving said video recording signal from the recording video-signal processing circuit and controlling a current value indicative of the video recording signal to be optimum for an ambient temperature;
a magnetic head for recording on a recording medium the video recording signal having an optimum temperature characteristic provided by the amplitude control circuit; and
a reproducing video-signal processing circuit for converting into a video signal a reproduction signal reproduced from the recording medium through the magnetic head,
wherein said amplitude control circuit includes;
a first resistor connected to said recording video-signal processing circuit; and
a thermistor connected in parallel to said first resistor for changing an amplitude of said video recording signal by a change in its resistance caused by the ambient temperature.

9. A magnetic recording/reproducing circuit system comprising:
a recording video-signal processing circuit for receiving a video signal and converting the video signal into a video recording signal;
an amplitude control circuit for receiving said video recording signal from the recording video-signal processing circuit and controlling a current value indicative of the video recording signal to be optimum for an ambient temperature;
a magnetic head for recording on a recording medium the video recording signal having an optimum temperature characteristic provided by the amplitude control circuit; and
a reproducing video-signal processing circuit for converting into a video signal a reproduction signal reproduced from the recording medium through the magnetic head,
wherein said amplitude control circuit includes:
detection means for detecting said video recording signal;
a recording-current detecting circuit for comparing a detection signal detected at said detection means with a reference signal of a reference power source varied depending on the ambient temperature and for generating a variable gain signal according to a difference between the detection signal and the reference signal; and
a variable gain amplifier circuit for receiving a variable gain signal from said recording-current detecting circuit and changing an amplitude of said video recording signal.

10. A magnetic recording/reproducing circuit system comprising:
a recording video-signal processing circuit for receiving a video signal and converting the video signal into a recording signal;
an amplitude control circuit for receiving said video recording signal from the recording video-signal processing circuit and controlling a current value indicative of the video recording signal to be optimum for an ambient temperature;
a first magnetic head for recording on a surface layer of a recording medium the video recording signal having an optimum temperature characteristic provided by the amplitude control circuit;
a reproducing video-signal processing circuit for converting into a video signal a reproduction signal reproduced from the recording medium through the first magnetic head;
a recording voice-signal processing circuit for receiving a voice signal and converting the voice signal into a voice recording signal;

a second magnetic head for recording said voice recording signal received from the recording voice-signal processing circuit in a deep layer of the recording medium; and a reproducing voice-signal processing circuit for converting into a voice signal a reproduction signal reproduced at the recording medium through the second magnetic head.

* * * * *